United States Patent
Koyama et al.

(10) Patent No.: US 8,919,201 B2
(45) Date of Patent: Dec. 30, 2014

(54) ACCELERATION MEASURING APPARATUS

(75) Inventors: Mitsuaki Koyama, Saitama (JP); Takeru Mutoh, Saitama (JP); Hiroki Iwai, Saitama (JP); Ryoichi Ichikawa, Saitama (JP)

(73) Assignee: Nihon Dempa Kogyo Co., Ltd., Tokyo (JP)

( * ) Notice: Subject to any disclaimer, the term of this patent is extended or adjusted under 35 U.S.C. 154(b) by 301 days.

(21) Appl. No.: 13/489,421

(22) Filed: Jun. 5, 2012

(65) Prior Publication Data
US 2012/0312097 A1 Dec. 13, 2012

(30) Foreign Application Priority Data
Jun. 7, 2011 (JP) .................. 2011-127644

(51) Int. Cl.
*G01P 15/125* (2006.01)
*G01P 15/09* (2006.01)
*G01P 15/097* (2006.01)
*G01P 15/08* (2006.01)

(52) U.S. Cl.
CPC .............. *G01P 15/125* (2013.01); *G01P 15/097* (2013.01); *G01P 2015/0817* (2013.01)
USPC .................. 73/514.32; 73/514.34; 73/514.36

(58) Field of Classification Search
USPC ............... 73/514.34, 514.32, 514.36, 514.38, 73/514.35
See application file for complete search history.

(56) References Cited

U.S. PATENT DOCUMENTS

| | | | | |
|---|---|---|---|---|
| 5,095,750 A | * | 3/1992 | Suzuki et al. | 73/514.19 |
| 5,770,799 A | * | 6/1998 | Nakamura et al. | 73/514.34 |
| 6,196,067 B1 | * | 3/2001 | Martin et al. | 73/514.32 |
| 6,588,276 B2 | * | 7/2003 | Yamashita | 73/514.34 |
| 7,119,550 B2 | * | 10/2006 | Kitano et al. | 324/658 |
| 7,134,339 B2 | * | 11/2006 | Mikado et al. | 73/514.29 |
| 7,288,873 B2 | * | 10/2007 | Salsman et al. | 310/322 |
| 8,677,828 B2 | * | 3/2014 | Koyama et al. | 73/651 |
| 2008/0202239 A1 | * | 8/2008 | Fazzio et al. | 73/504.18 |
| 2012/0180567 A1 | * | 7/2012 | Koyama et al. | 73/579 |
| 2012/0180568 A1 | * | 7/2012 | Koyama et al. | 73/579 |
| 2012/0326566 A1 | * | 12/2012 | Koyama et al. | 310/338 |
| 2013/0154442 A1 | * | 6/2013 | Koyama et al. | 310/319 |
| 2013/0255402 A1 | * | 10/2013 | Koyama et al. | 73/862.625 |
| 2014/0062258 A1 | * | 3/2014 | Koyama et al. | 310/323.21 |

FOREIGN PATENT DOCUMENTS

| | | |
|---|---|---|
| JP | H07-167885 | 7/1995 |
| JP | 2004-198310 | 7/2004 |

* cited by examiner

*Primary Examiner* — Helen Kwok
(74) *Attorney, Agent, or Firm* — Jianq Chyun IP Office

(57) ABSTRACT

An acceleration measuring apparatus that can easily detect acceleration with high accuracy is provided. In the apparatus, positional displacement of a swingable pendulum member is detected, feedback control is performed to maintain the pendulum member in a stationary state using an actuator, and acceleration is measured by measuring the output of the actuator at this time. A movable electrode is provided to the pendulum member, and a loop is formed in which a fixed electrode provided to oppose the movable electrode, and an oscillating circuit, a crystal unit, and the movable electrode are electrically connected in series. By measuring an oscillating frequency of the oscillating circuit at this time, a change in the size of a variable capacitance formed between the movable electrode and the fixed electrode is detected, and thereby the positional displacement of the pendulum member is detected.

2 Claims, 8 Drawing Sheets

Cv1 FIRST VARIABLE CAPACITANCE
Cv2 SECOND VARIABLE CAPACITANCE
1 CONTAINER
2 PENDULUM MEMBER
4 CRYSTAL UNIT
41 OSCILLATING CIRCUIT
42 SWITCHING UNIT
5 ACTUATOR
6 PENDULUM POSITION DETECTING UNIT
61 REGULATING UNIT
62 DATA PROCESSING UNIT

3 CIRCUIT CONTAINER
6 POSITION DETECTING UNIT
21 SUPPORTED PORTION
22 BENDING PORTION
23 SPINDLE PORTION
61 REGULATING UNIT (a) FIRST SURFACE SIDE  (b) SECOND SURFACE SIDE

Cv1 FIRST VARIABLE CAPACITANCE
Cv2 SECOND VARIABLE CAPACITANCE
 1 CONTAINER
 2 PENDULUM MEMBER
 4 CRYSTAL UNIT
41 OSCILLATING CIRCUIT
42 SWITCHING UNIT

5 ACTUATOR
 6 PENDULUM POSITION DETECTING UNIT
61 REGULATING UNIT
62 DATA PROCESSING UNIT

ACCELERATION MEASURING APPARATUS

CROSS-REFERENCE TO RELATED APPLICATION

This application claims the priority benefit of Japanese application serial no. 2011-127644, filed Jun. 7, 2011. The entirety of the above-mentioned patent applications is hereby incorporated by reference herein and made a part of specification.

BACKGROUND OF THE INVENTION

1. Field of the Invention

The present invention relates to a technology for detecting acceleration based on an oscillating frequency using a piezoelectric plate such as a crystal plate.

2. Description of Related Art

In order to measure an earthquake or the like, one important issue is detecting weak and low frequency acceleration. It is desirable to measure with high accuracy using a structure that is as simple as possible when carrying out this kind of measurement. As a sensor for detecting weak and low frequency acceleration, a servo-type acceleration measuring apparatus is often used.

In general, a servo-type acceleration measuring apparatus is constituted by a pendulum, a pendulum position detector, an actuator that applies a force to the pendulum, and a regulating unit that controls the actuator based on a detection result by the pendulum position detector. The pendulum is constituted by a spindle and a spring. One end of the spring is fixed to a container of the acceleration measuring apparatus, and the position of the spindle is displaced relative to the container by the action of an inertial force when acceleration is exerted on the acceleration measuring apparatus. A resonance frequency of the pendulum is set extremely low, and even a slight acceleration largely displaces the pendulum. The displacement of the pendulum relative to the container is proportional to the exerted acceleration in a frequency range that is lower than the resonance frequency of the pendulum. The pendulum position detector is a sensor that detects positional displacement of the pendulum relative to the container. The actuator consists of a coil provided to the pendulum and a magnetic circuit provided to the container. The position of the pendulum can be displaced by an electromagnetic force that is generated when a current is applied to the coil. The regulating unit is for applying a current to the coil of the actuator based on positional displacement data of the pendulum obtained by the pendulum position detector.

If acceleration from an outside force is exerted on the acceleration measuring apparatus, the position of the pendulum is displaced by an inertial force. At this time, a current is applied to the actuator from the regulating unit, and by exerting an electromagnetic force that is the same size as the inertial force but is in the opposite direction on the pendulum, the pendulum can be maintained in a stationary state. Therefore, by detecting the positional displacement of the pendulum with the pendulum position detector and then operating the actuator so that the positional displacement is zero, the positional displacement of the pendulum can be feedback controlled. By measuring the output of the actuator at this time, for example by measuring the current value applied to the coil, the acceleration of the outside force can be measured. This kind of servo-type acceleration measuring apparatus has characteristics of high accuracy and high resolution and is capable of measuring frequencies of about 0 to 400 Hz.

As a method for detecting the position of the pendulum in a servo mechanism of a servo-type acceleration measuring apparatus, an optical method and a capacitor method are mainly used. Among these, an optical-type pendulum position detector uses a laser diode, a two-element segmented photodiode, and a lens. As a method for detection using an optical-type pendulum position detector, a type of differential method is employed. However, an optical-type pendulum position detector presents problems in that it has a complex structure and the life of the photodiode is short. A capacitor-type pendulum position detector has a structure in which a capacitance is formed such that it changes by the positional displacement of the pendulum, and the pendulum position is detected by detecting the change in capacitance. However, the influence of noise cannot be eliminated, and thus it is difficult to detect the acceleration with high accuracy.

Patent Document 1 discloses an acceleration sensor in which a constant current is made to flow through a movable electrode, and acceleration is detected by detecting the number of pulses of an induced current generated in a fixed electrode that opposes the movable electrode. However, this acceleration sensor is different from the present invention. Patent Document 2 discloses a capacitance change detection-type acceleration sensor, in which two variable capacitances are formed between a movable center plate and fixed plates provided on both sides of the movable center plate, and antiphase pulse voltages are respectively applied to the two fixed plates. Both variable capacitances change when the position of the center plate is displaced due to the generation of acceleration, and the acceleration is detected at this time by detecting a shift in the pulse phase of the voltage applied from the fixed plates to the center plate. However, this capacitance change detection-type acceleration sensor is different from the present invention.

[Patent Document 1] Japanese Patent Application Laid-Open (JP-A) No. H7-167885

[Patent Document 2] Japanese Patent Application Laid-Open (JP-A) No. 2004-198310

SUMMARY OF THE INVENTION

The present invention was created in light of the above-described background, and an objective thereof is to provide an acceleration measuring apparatus that can easily detect acceleration with high accuracy.

The acceleration measuring apparatus of the present invention detects a displacement from a reference position of a pendulum member that is about to swing due to an inertial force, applies an external force to the pendulum member by an operating unit based on a detection result of the displacement to immobilize the pendulum member in the reference position, and evaluates an acceleration acting on the pendulum member based on a size of the external force at this time, the apparatus comprising:

a piezoelectric plate;

a first drive electrode and a second drive electrode provided respectively on a first surface side and a second surface side of the piezoelectric plate in order to vibrate the piezoelectric plate;

an oscillating circuit that is electrically connected to the first drive electrode;

a movable electrode for forming a variable capacitance that is provided on the pendulum member and the movable electrode being electrically connected to the second drive electrode;

a fixed electrode separated from the pendulum member, provided so as to oppose the movable electrode, and connected to the oscillating circuit, the fixed electrode forming a variable capacitance upon a change in capacitance between the fixed electrode and the movable electrode due to swinging of the pendulum member; and a frequency information detecting unit for detecting a signal that is frequency information corresponding to an oscillating frequency of the oscillating circuit, wherein an oscillation loop is formed beginning from the oscillating circuit, passing through the first drive electrode, the second drive electrode, the movable electrode, and the fixed electrode, and then returning to the oscillating circuit, and the frequency information detected by the frequency information detecting unit is for evaluating the displacement from the displacement position of the pendulum member.

Further, in the acceleration measuring apparatus of the present invention, the movable electrode includes a first movable electrode and a second movable electrode provided so as to sandwich the pendulum member and oppose each other in a direction in which the inertial force acts;

the fixed electrode includes a first fixed electrode and a second fixed electrode provided so as to be separated from the pendulum member and respectively oppose the first movable electrode and the second movable electrode;

a switching unit is further provided, wherein the switching unit is capable of switching an electrical connection destination of the oscillating circuit between a first variable capacitance between the first movable electrode and the first fixed electrode and a second variable capacitance between the second movable electrode and the second fixed electrode; and the frequency information detecting unit calculates information corresponding to a difference between an oscillating frequency corresponding to the first variable capacitance and another oscillating frequency corresponding to the second variable capacitance that are time-divided by the switching unit.

In addition, the pendulum member can be cantilevered at one end thereof by a supporting unit. Also, the pendulum member can be the piezoelectric plate, or can include the piezoelectric plate in a portion thereof.

The present invention captures the displacement when the pendulum member is displaced from a reference position upon swinging due to acceleration as a change in the oscillating frequency of the piezoelectric plate via a change in a capacitance between the movable electrode of the pendulum member and the fixed electrode that opposes the movable electrode. Therefore, the acceleration can be easily detected with high accuracy. Further, by forming a variable capacitance on both sides relative to the direction in which the pendulum swings, a differential method can be applied when measuring a change in the oscillating frequency. Thus, the influence of noise and temperature characteristics can be suppressed, and the acceleration can be detected with even higher accuracy.

DETAILED DESCRIPTION OF EMBODIMENTS

Figure 1:
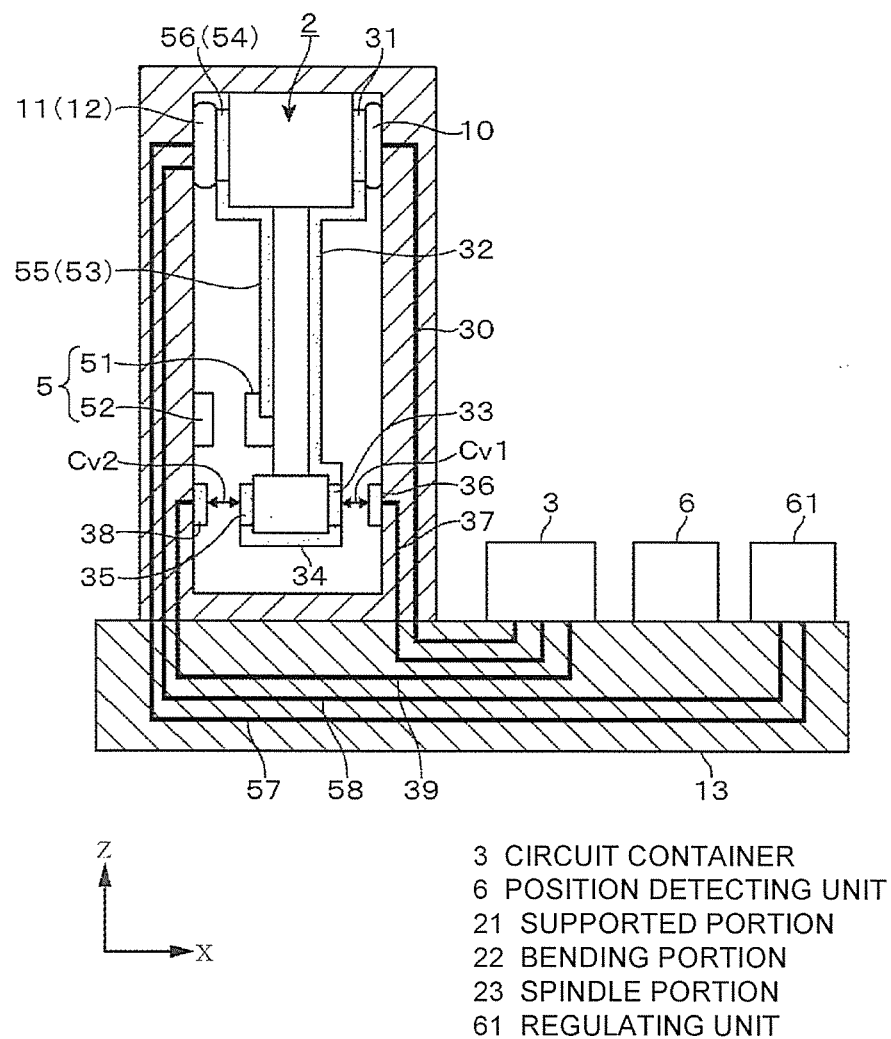
FIG. 1 is a longitudinal side view schematically illustrating the main parts of the acceleration measuring apparatus according to an embodiment of the present invention.

A servo-type acceleration measuring apparatus according to an embodiment of the present invention will now be explained. The servo-type acceleration measuring apparatus of this embodiment is mainly constituted by a pendulum member that is a target of position control, a pendulum position detecting unit that detects a positional displacement of the pendulum based on a change in oscillating frequency and outputs an electrical signal of the positional displacement data, a regulating unit that controls the output of an actuator so that the pendulum is maintained in a stationary state based on the positional displacement data received from the pendulum position detecting unit, an actuator that exerts a force on the pendulum, and, for example, a data processing unit that calculates an acceleration of an inertial force from the amount of the driving electric power of the actuator. FIG. 1 is a view illustrating the servo-type acceleration measuring apparatus according to the present embodiment. In FIG. 1, 1 denotes a rectangular parallelepiped-shaped sealed container consisting of, for example, crystal. An inert gas such as nitrogen gas is sealed within the container 1. The container 1 is not necessarily limited to a sealed container. The container 1 is fixed to an insulating substrate 13.

Within the container 1, a plate-shaped pendulum member 2 is fixed by conductive adhesives 10, 11, and 12 to upper areas on the inner walls of the container 1, which correspond to supporting units, on a first surface side and a second surface side at one end of the pendulum member 2. In other words, the pendulum member 2 is cantilevered so that it is standing in the vertical direction with the supported locations at the top in the upper portion inside the container 1. The pendulum member 2 can be divided into three portions from the top along the longitudinal direction (vertical direction) thereof: a supported portion 21 that is fixed to the container 1 by conductive adhesives 10, 11, and 12; a bending portion 22 that is thinner than the supported portion 21 and tries to bend when an inertial force acts on the pendulum member 2; and a spindle portion 23 that is thicker than the bending portion 22 and secures a mass for increasing the inertial force that acts on the pendulum member 2 so as to facilitate the detection of the positional displacement of the pendulum member 2. The pendulum member 2 swings in the left-right direction (X direction) in FIG. 1 with the supported portion 21 as a fulcrum. In the spindle portion 23, a first movable electrode 33 and a second movable electrode 35 to be explained later can also serve as the spindle by increasing their thickness.

Figure 2:
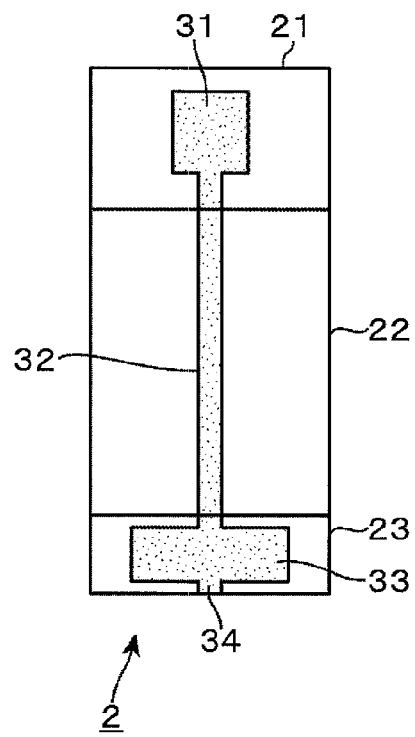
FIG. 2 is a plan view illustrating a first surface and a second surface of a pendulum member used in the acceleration measuring apparatus.
Figure 2:
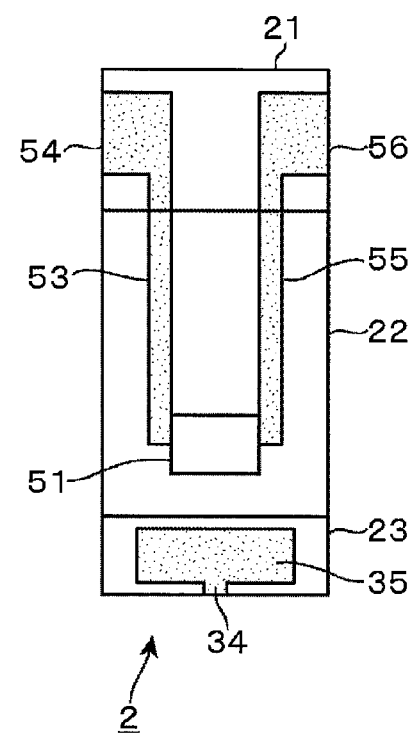
Figure 2:
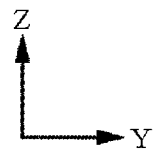
Figure 2:
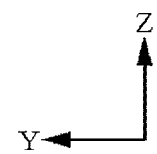

On the top surface of the supported portion 21 on the first surface side of the pendulum member 2, an extraction electrode 31 is formed as shown in FIG. 2(a). The extraction electrode 31 is electrically connected to the first movable electrode 33 provided on the top surface on a first surface side of the spindle portion 23 of the pendulum member 2 via a conduction path 32 formed on the top surface of the first surface side. Further, the first movable electrode 33 is electrically connected to the second movable electrode 35 provided on the top surface on a second surface side of the spindle portion 23 via a conduction path 34 formed so as to bend back from the first surface side of the spindle portion 23 via the other end of the pendulum member 2 to the second surface side of the spindle portion 23. The conduction paths and the various electrodes in the present embodiment are made of, for example, metallic thin films made by sputtering fabrication.

As shown in FIG. 2(b), extraction electrodes 54 and 56 made of, for example, metallic thin films are respectively formed on both ends in the left-right direction (Y direction) of the supported portion 21 on the second surface side of the pendulum member 2. The extraction electrodes 54 and 56 are respectively electrically connected to the both ends of a coil within a coil unit 51 that is provided on the top surface of the bending portion 22 on the second surface side of the pendulum member 2 via respective conduction paths 53 and 55.

A first fixed electrode 36 and a second fixed electrode 38 are formed on the inner walls of the container 1 so as to respectively oppose the first movable electrode 33 and the second movable electrode 35. The gap between the first movable electrode 33 and the first fixed electrode 36 forms a first variable capacitance Cv1, and the gap between the second movable electrode 35 and the second fixed electrode 38 forms a second variable capacitance Cv2.

A magnetic circuit 52 including, for example, a permanent magnet is provided on the inner wall of the container 1 so as to oppose the coil unit 51. The coil of the coil unit 51 is set so that the orientation of a magnetic flux that is generated when the coil is energized is directed toward the magnetic circuit 52, and the position (run-out position) of the pendulum member 2 can be adjusted by adjusting the orientation and size of a current that is applied. The coil unit 51 and the magnetic circuit 52 constitute an actuator 5.

Figure 3:
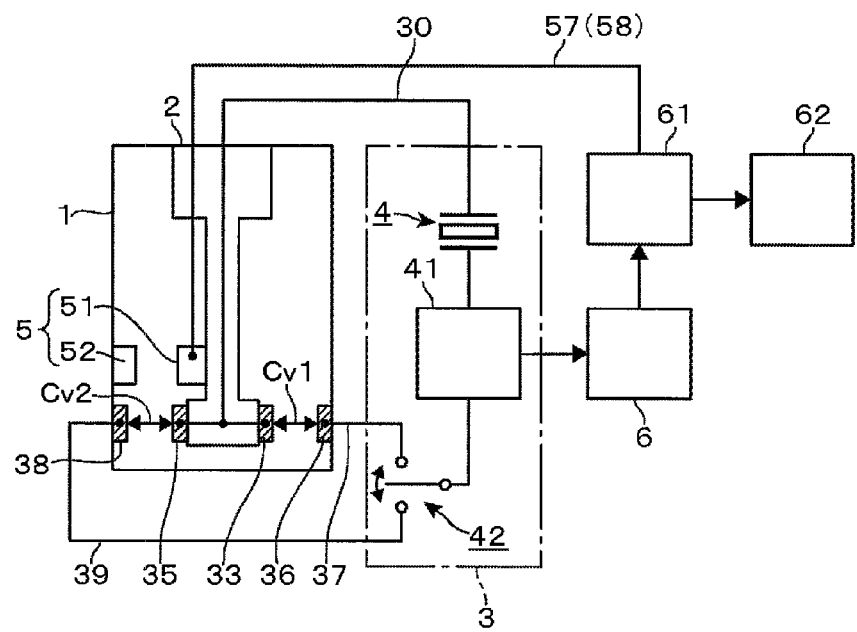
FIG. 3 is a block diagram illustrating a circuit constitution of the acceleration measuring apparatus.
Figure 4:
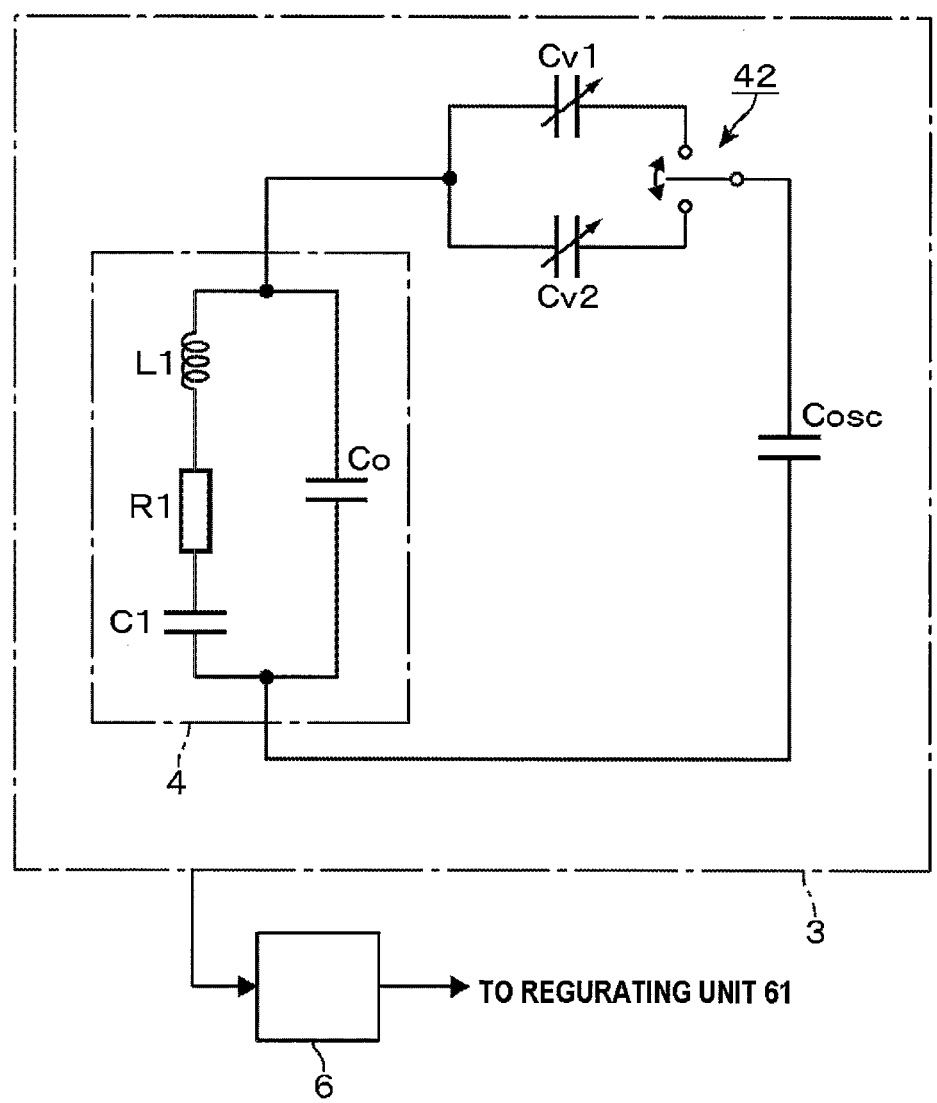
FIG. 4 is a circuit diagram illustrating an equivalent circuit of a pendulum position detector in the acceleration measuring apparatus.

FIG. 3 illustrates the connection state of wiring of an acceleration sensor, and FIG. 4 illustrates an equivalent circuit. In FIG. 4, L1 denotes a motional inductance corresponding to the mass of a crystal unit, C1 denotes a motional capacitance, R1 denotes a motional resistance, C0 denotes an RMS shunt capacitance that includes an inter-electrode capacitance, and Cosc denotes a load capacitance of an oscillating circuit 41. As shown in FIGS. 1 and 3, the extraction electrode 31 that is connected to the movable electrodes 33 and 35 is electrically connected to a crystal unit 4 via a conduction path 30 that passes through the conductive adhesive 10, the container 1, and the insulating substrate 13. The crystal unit 4 is electrically connected to one end of the oscillating circuit 41. Meanwhile, the fixed electrodes 36 and 38 are connected to a switching contact point side of a switching unit 42 via respective conduction paths 37 and 39. A fixed contact point side of the switching unit 42 is electrically connected to the other end of the oscillating circuit 41 and is configured so that the oscillating circuit 41 can be alternately switched between the fixed electrodes 36 and 38. The crystal unit 4, the oscillating circuit 41, and the switching unit 42 are accommodated within a container 3 that is fixed to the insulating substrate 13. The switching by the switching unit 42 is constituted so as to be automatically carried out in cycles of, for example, 10 Hz (the connection time is 100 ms). Thereby, an oscillating frequency FLx1 obtained in a loop via the first variable capacitance Cv1 and an oscillating frequency FLx2 obtained in a loop via the second variable capacitance Cv2 are introduced by time-division into a pendulum position detecting unit 6.

According to JIS C 6701 "Generic Specification of Quartz Crystal Units", a general formula for crystal oscillating circuits is represented by the following formula (1).

$$FL = Fr \times (1+x)$$

$$x = (C1/2) \times 1/(C0+CL) \quad (1)$$

FL is the oscillating frequency when a load is applied to the crystal unit, and Fr is the resonance frequency of the crystal unit itself.

In the present embodiment, as shown in FIGS. 3 and 4, a load capacitance CL is a combined capacitance in which Cosc and a variable capacitance Cv are serially connected. Therefore, y represented by formula (2) can be substituted for CL in formula (1).

$$y = 1/(1/Cv + 1/Cosc) \quad (2)$$

Accordingly, if the position of the pendulum member 2 changes, and thereby the variable capacitance Cv changes from Cv0 to Cvx, then a frequency change dFL is represented by formula (3).

$$dFL = FL0 - FLx = A \times Cosc^2 \times (Cvx - Cv0)/(B \times C) \quad (3)$$

Herein, $$A = C1 \times Fr/2,$$

$$B = C0 \times Cosc + (C0 + Cosc) \times Cv0, \text{ and}$$

$$C = C0 \times Cosc + (C0 + Cosc) \times Cvx.$$

If a separation distance between the movable electrode and the fixed electrode in a so-called reference state (stationary state) when no acceleration is being exerted on the pendulum member 2 is denoted as d0, and the separation distance when an acceleration is exerted on the pendulum member 2 is denoted as dx, the following formula (4) is established.

$$Cv0 = S \times \in /d0$$

$$Cvx = S \times \in /dx \quad (4)$$

Herein, S is the surface area of an opposing region of the movable electrode and the fixed electrode, and ∈ is a dielectric constant.

Since d0 is already known, it can be understood that dFL and dx (in other words, a positional displacement Δd of the pendulum member 2=d0−dx) are in a correspondence relationship.

In the pendulum position detecting unit 6, the differences ΔF1 (=FL01−F1x1) and ΔF2 (=FL02−FLx2) between oscillating frequencies FLx1 and FLx2 that respectively correspond to the first variable capacitance and the second variable capacitance and oscillating frequencies (hereinafter referred to as reference frequencies) FL01 and FL02 when the pendulum member 2 is in a stationary state are calculated, and then frequency change rates ΔF1/FL01 and ΔF2/FL02, representing the values when the differences ΔF1 and ΔF2 are respectively divided by the reference frequencies corresponding thereto, are calculated. Next, a difference ΔF between the frequency change rates ΔF1/FL01 and ΔF2/FL02 is calculated. The positional displacement Δd of the pendulum member 2 can be calculated from the change rate difference ΔF. The positional displacement Δd refers to Δd=d01−dx1=dx2−d02, in which d01 is the separation distance (a first separation distance dx1) between the first movable electrode and the first fixed electrode when the pendulum member 2 is in a stationary position and d02 is the separation distance (a second separation distance dx2) between the second movable electrode and the second fixed electrode when the pendulum member 2 is in a stationary state.

Figure 5:
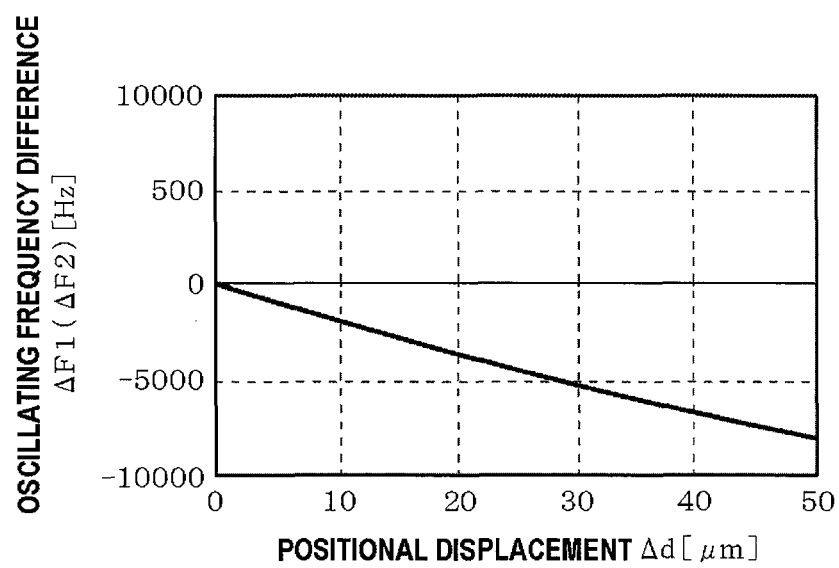
FIG. 5 is a characteristics chart illustrating the relationship between positional displacement of the pendulum member and a difference in oscillating frequencies obtained using the acceleration measuring apparatus.

FIG. 5 is experimental data illustrating the relationship between the positional displacement Δd of the pendulum member 2 and the difference ΔF1 (ΔF2) of the oscillating frequencies. As shown in FIG. 5, the relationship between the positional displacement Δd and the oscillating frequency difference ΔF1 (ΔF2) is a one-to-one correspondence. Therefore, the positional displacement Δd can be calculated by measuring the oscillating frequency difference ΔF1 (ΔF2). Further, by finding the change rate difference ΔF between the oscillating frequency differences ΔF1 and ΔF2 and then calculating the positional displacement Δd from the change rate difference ΔF, adverse effects from noise and temperature characteristics can be suppressed. In this way, in the pendulum position detecting unit 6, a signal corresponding to the calculated positional displacement Δd is sent to a regulating unit 61.

The regulating unit 61 adjusts the size and orientation of a current applied to the coil of the coil unit 51 of the actuator 5 by, for example, thyristor phase control based on the size of the received positional displacement Δd. Thereby, the regulating unit 61 performs control to operate the actuator 5 so that the positional displacement Δd becomes zero and the pendulum member 2 is maintained in a stationary state in the reference position. The regulating unit 61 sends a signal corresponding to the size of an electromagnetic force exerted on the pendulum member 2 by the actuator 5, such as a current value of the coil of the coil unit 51, to a data processing unit 62.

The data processing unit 62 consists of, for example, a personal computer, and has a function to calculate the acceleration of inertial force referring to a data table that has been pre-stored in a memory and associates a current value of the coil of the coil unit 51 and an acceleration operating on the pendulum member 2, based on information related to the size of the electromagnetic force of the actuator 5 obtained from the regulating unit 61, such as the current value applied to the coil of the coil unit 51. As long as the pendulum member 2 is maintained in a stationary state, the inertial force, which is a target of detection, and the size of the electromagnetic force exerted on the pendulum member 2 by the actuator 5 counterbalance each other, and thus the acceleration of the inertial force can be calculated from the current value of the coil of the coil unit 51.

Next, the operation in the present embodiment will be explained. First, the acceleration measuring apparatus is fixed to a vibration detection target so that the container 1 is in a predetermined posture. If the vibration detection target vibrates and a vibrating component is generated in a vibration measurement direction of the acceleration measuring apparatus, an inertial force is exerted on the spindle portion 23 of the pendulum member 2. The bending portion 22 of the pendulum member 2 bends in accordance with the size of the inertial force, and thus one of the separation distances, for example the first separation distance, narrows slightly, and conversely the other separation distance, such as the second separation distance, widens slightly. Accordingly, the first variable capacitance becomes larger, and the second variable capacitance becomes smaller. Thereby, the oscillating frequencies respectively correspond to the first variable capacitance and the second variable capacitance change. The differences ΔF1 and ΔF2 between the oscillating frequencies and the reference frequencies at this time are detected in the pendulum position detecting unit 6, and then the positional displacement of the pendulum member 2 is calculated from the differences ΔF1 and ΔF2. The data of the calculated positional displacement is continuously sent to the regulating unit 61, and in the regulating unit 61, the size and orientation of a current applied to the coil of the coil unit 51 of the actuator 5 is adjusted by, for example, thyristor phase control based on the positional displacement data so as to control the positional displacement such that it becomes zero. Thereby, it can be regarded that the pendulum member 2 is actually maintained in the reference position, which is a stationary state in a vertical posture in this example. For example, by constantly monitoring the current value of the coil of the coil unit 51, the acceleration of the vibration of the detection target can be measured. By preparing 3 of these acceleration sensors and arranging them so that the vibration direction of the pendulum of each sensor is different from the others and the vibration directions of the three sensors do not lie on the same plane, the vibration can be measured in three dimensions.

FIG. 3 illustrates the connection state of wiring of an acceleration sensor, and FIG. 4 illustrates an equivalent circuit. In FIG. 4, L1 denotes a motional inductance corresponding to the mass of a crystal unit, C1 denotes a motional capacitance, R1 denotes a motional resistance, C0 denotes an RMS shunt capacitance that includes an inter-electrode capacitance, and Cosc denotes a load capacitance of an oscillating circuit 41. As shown in FIGS. 1 and 3, the extraction electrode 31 that is connected to the movable electrodes 33 and 35 is electrically connected to a crystal unit 4 of a circuit container 3 via a conduction path 30 that passes through the conductive adhesive 10, the container 1, and the insulating substrate 13. The crystal unit 4 is electrically connected to one end of the oscillating circuit 41. Meanwhile, the fixed electrodes 36 and 38 are connected to a switching contact point side of a switching unit 42 via respective conduction paths 37 and 39. A fixed contact point side of the switching unit 42 is electrically connected to the other end of the oscillating circuit 41 and is configured so that the oscillating circuit 41 can be alternately switched between the fixed electrodes 36 and 38. The crystal unit 4, the oscillating circuit 41, and the switching unit 42 are accommodated within the circuit container 3 that is fixed to the insulating substrate 13. The switching by the switching unit 42 is constituted so as to be automatically carried out in cycles of, for example, 10 Hz (the connection time is 100 ms). Thereby, an oscillating frequency FLx1 obtained in a loop via the first variable capacitance Cv1 and an oscillating frequency FLx2 obtained in a loop via the second variable capacitance Cv2 are introduced by time-division into a pendulum position detecting unit 6.

Since two variable capacitances Cv1 and Cv2 are formed for a single pendulum member 2 and they are arranged in the same temperature environment, even if the frequencies respectively corresponding to the variable capacitances Cv1 and Cv2 change due to temperature, such a change can be cancelled so that the detection can be limited to only changes in the frequency change rate based on the positional displacement Δd of the pendulum member 2. Therefore, an effect is achieved in that the detection accuracy is high.

Figure 6:
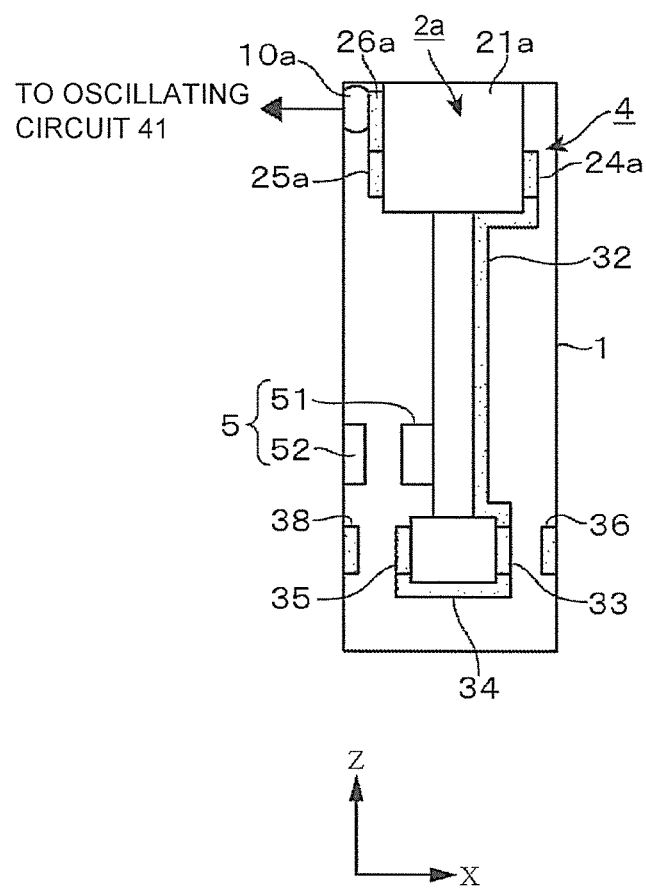
FIG. 6 is a longitudinal side view illustrating another embodiment according to the present invention.
Figure 7:
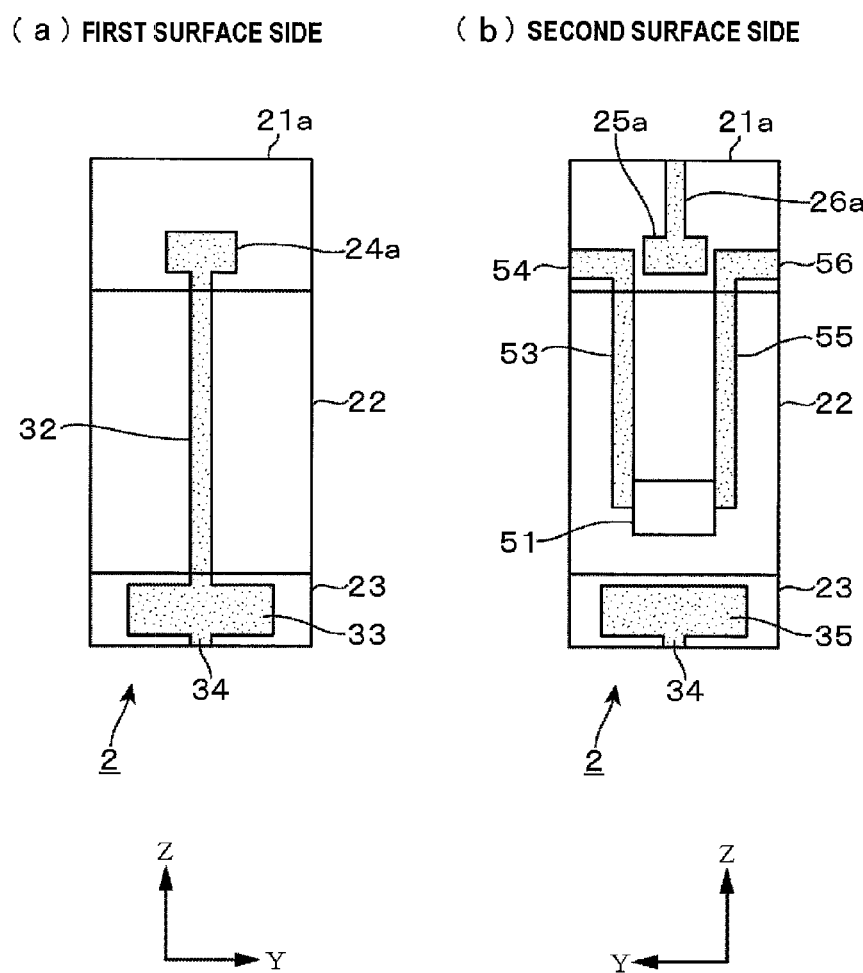
FIG. 7 is a plan view illustrating a first surface and a second surface of a pendulum member used in the acceleration measuring apparatus shown in FIG. 6.

Next, another embodiment of the present invention will be explained with reference to FIGS. 6 and 7. This embodiment is different from the above-explained embodiment in that the supported portion 21 of the pendulum member 2 in the above-explained embodiment also serves as the crystal unit 4. First, the structure of the acceleration measuring apparatus in the present embodiment will be explained. Structures that are identical to those in the above-explained embodiment will be assigned the same reference numerals as those used above and explanations thereof will be omitted. A pendulum member 2a in the present embodiment consists of a crystal. Drive electrodes 24a and 25a are respectively formed on a first surface side and a second surface side of a supported portion 21a. The drive electrode 24a on the first surface side is electrically connected to the movable electrode 33 via the conduction path 32. The drive electrode 25a on the second surface side is connected to one end of the oscillating circuit 41 via a conduction path 26a, a conductive adhesive 10a for fixing the pendulum member 2a to the container 1, and a conduction path that is not illustrated.

According to the present embodiment, in addition to the effects of the above-explained embodiment, it is not necessary to provide a space for installing the crystal unit 4 at another location separate from the pendulum member 2, and this contributes to the miniaturization of the acceleration measuring apparatus.

In the present embodiment, the entire pendulum member 2 consists of a crystal. However, other constitutions are possible as long as the portion sandwiched by the drive electrodes 24a and 25a in the supported portion 21a is a crystal.

Figure 8:
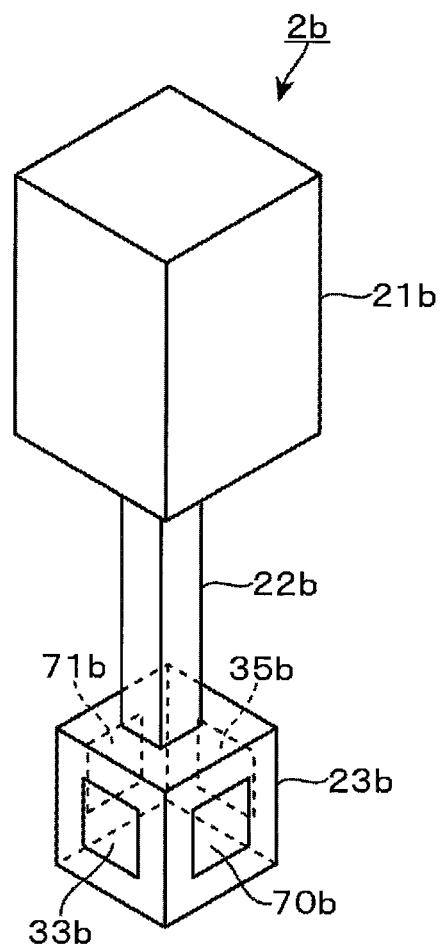
FIG. 8 is a perspective view illustrating a pendulum member in another embodiment according to the present invention.

FIG. 8 illustrates a pendulum member 2b related to another embodiment. In this embodiment, the shape of the pendulum member 2b is not a plate shape as in the above-described embodiments, but rather it is configured as a rod-shaped pendulum member 2b in which the cross-section along the horizontal plane is a square shape. Thus, the bending portion 22b can bend in any horizontal direction. Movable electrodes 33b, 35b, 70b, and 71b are respectively formed on each of the four side surfaces of the spindle portion 23b. The two pairs of movable electrodes (the pair of 33b and 35b, and the pair of 70b and 71b) that oppose each other with the spindle portion 23b therebetween are formed on the surface of a spindle portion 23b of the pendulum member 2b so as to respectively oppose fixed electrodes (not illustrated). In other words, two pairs of the first variable capacitance Cv1 and the second variable capacitance Cv2 that are perpendicular to each other in the horizontal direction are provided. According to this constitution, the acceleration can be calculated for vibration in any horizontal direction. In FIG. 8, for the sake of convenience in order to make the drawing easy to understand, the conduction paths and terminals have been omitted. In the present embodiment, two pairs of the first variable capacitance Cv1 and the second variable capacitance Cv2 that are perpendicular to each other in the horizontal direction are provided, but they do not have to be perpendicular to each other as long as the two pairs are provided in parallel.

In the above-explained embodiments, the pendulum member 2 is maintained in a stationary state by an electromagnetic force. However, for example, another force such as an electrostatic force can be applied to maintain the stationary state. Further, in the above-explained embodiments, the pendulum member 2 is a plate-shaped or rod-shaped member that is cantilevered. However, the present invention is not limited to such constitutions, and for example, the pendulum member can be swingably supported on both sides by elastic members.

What is claimed is:

1. An acceleration measuring apparatus comprising:
   a pendulum member, extending in a vertical direction, wherein an upper end of the pendulum member is supported;
   a piezoelectric resonator comprising a piezoelectric plate and a first drive electrode and a second drive electrode provided respectively on a first surface side and a second surface side of the piezoelectric plate in order to vibrate the piezoelectric plate;
   an oscillating circuit, configured to oscillate the piezoelectric resonator;
   a first movable electrode and a second movable electrode each respectively disposed on opposite surfaces of the pendulum member in a horizontal direction, configured to form variable capacitances;
   a first fixed electrode separated from the pendulum member, provided so as to oppose the first movable electrode, configured to form a first variable capacitance upon a change in capacitance between the first fixed electrode and the first movable electrode due to swinging of the pendulum member;
   a second fixed electrode separated from the pendulum member, provided so as to oppose the second movable electrode, configured to form a second variable capacitance upon a change in capacitance between the second fixed electrode and the second movable electrode due to swinging of the pendulum member;
   a switching unit, configured to alternately switch the connection of the first variable capacitance and the second variable capacitance with an oscillation loop comprising the oscillating circuit and the piezoelectric resonator;
   a frequency information detecting unit, configured to calculates frequency information corresponding to a difference between an oscillating frequency corresponding to the first variable capacitance and another oscillating frequency corresponding to the second variable capacitance that are time-divided by the switching unit; and
   an operating unit, configured to apply an external force to the pendulum member to immobilize the pendulum member in a reference position based on the frequency information detected by the frequency information detecting unit, the reference position is a stationary state in a vertical posture, and wherein an acceleration acting on a pendulum member is evaluated based on a size of the external force.

2. The acceleration measuring apparatus according to claim 1, wherein the pendulum member is the piezoelectric plate, or includes the piezoelectric plate in a portion thereof.

* * * * *